United States Patent
Shin et al.

(10) Patent No.: US 7,864,859 B2
(45) Date of Patent: Jan. 4, 2011

(54) METHOD AND CIRCUIT FOR CODING MODE DETERMINATIONS RECOGNIZING AUTO EXPOSURE CONTROL OF INPUT IMAGE

(75) Inventors: Sun-Young Shin, Suwon-si (KR); Hyun-Sang Park, Cheonan-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 1361 days.

(21) Appl. No.: 11/315,091

(22) Filed: Dec. 23, 2005

(65) Prior Publication Data

US 2006/0182355 A1 Aug. 17, 2006

(30) Foreign Application Priority Data

Feb. 2, 2005 (KR) .................. 10-2005-009542

(51) Int. Cl.
*H04B 1/66* (2006.01)
*G06K 9/46* (2006.01)

(52) U.S. Cl. ................... 375/240.16; 382/236
(58) Field of Classification Search ............ 375/240.16, 375/240.12, 240.23, 240.24, 240.13, 240.27; 382/236, 132, 166, 128, 103, 104, 131, 218; 348/222.1, 187, 65, 47, 231.2, 241, 308; 715/738, 721, 863; 358/1.18, 3.03, 474, 358/1.15, 473; 399/100, 176, 30

See application file for complete search history.

(56) References Cited

U.S. PATENT DOCUMENTS 6,879,341 B1 * 4/2005 Silverbrook ............. 348/231.6

FOREIGN PATENT DOCUMENTS

| JP | 08-251597 | 9/1996 |
| JP | 2003284091 A | 10/2003 |
| KR | 1020000037705 A | 7/2000 |
| KR | 1020010053814 A | 7/2001 |
| KR | 1020010069016 A | 7/2001 |
| KR | 1020040061245 A | 7/2004 |
| KR | 1020040080258 A | 9/2004 |
| WO | WO 96/19073 | 6/1996 |

* cited by examiner

*Primary Examiner*—Saeid Ebrahimi Dehkordy
(74) *Attorney, Agent, or Firm*—Volentine & Whitt, PLLC

(57) ABSTRACT

An image compression method adapted to determine block mode for an input image and a related circuit are disclosed. First and second determinations of block mode are made in relation to first and second threshold comparisons. The second comparison is conditioned upon a prior determination of auto-exposure control for the input image.

29 Claims, 5 Drawing Sheets

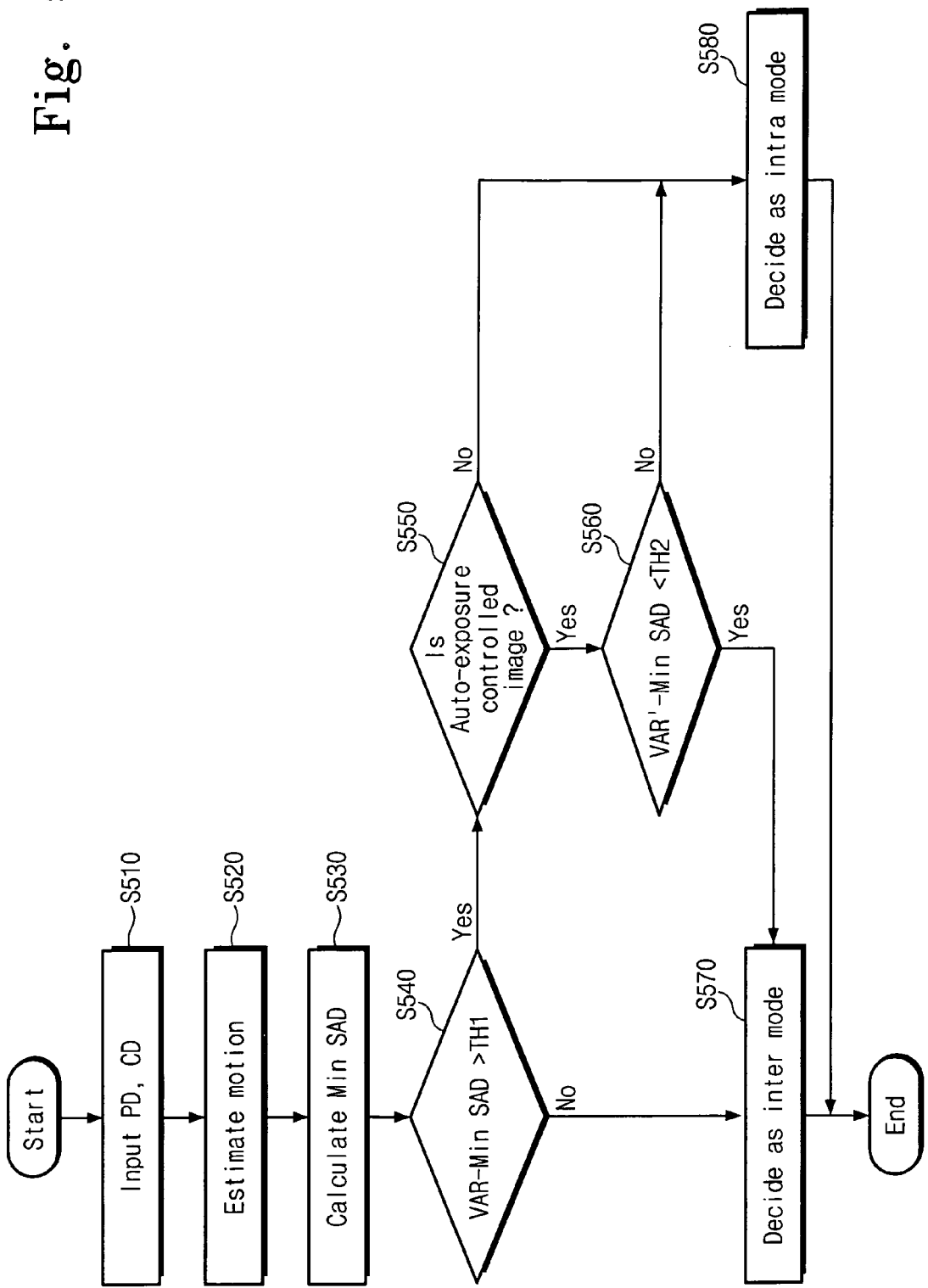

METHOD AND CIRCUIT FOR CODING MODE DETERMINATIONS RECOGNIZING AUTO EXPOSURE CONTROL OF INPUT IMAGE

BACKGROUND OF THE INVENTION

1. Field of the Invention

Embodiments of the invention relate to image processing circuits and methods. More particularly, embodiments of the invention relate to a method of determining a coding mode adapted to increase the data compression rate for an auto exposure controlled image and a related circuit.

This application claims the benefit of Korean Patent Application No. 2005-09542 filed Feb. 2, 2005, the subject matter of which is incorporated herein by reference in its entirety.

2. Description of the Related Art

Conventional encoding methods for digital data generated by an image encoding system using correlativity between frames may be classified as intra-frame (or "intra") mode of operation and inter-frame (or "inter") mode of operation. Data is compressed regardless of the particular correlativity of frames in an intra mode. However, data is compressed in an inter mode by first identifying the most similar data between a body of target data and actual image data, and thereafter obtaining difference values (or "differences) between the two data bodies, and finally encoding only the differences.

FIG. 1 is a block diagram illustrating a conventional image encoder. As shown in FIG. 1, the image encoder includes a first frame memory 101, a transformer 102, a quantization unit 103, an encoding unit 104, an inverse-quantization unit 105, an inverse-transformer 106, a second frame memory 107, a motion estimator (ME) 108, a motion compensator (MC) 109 and a block mode deciding unit 110.

Input image data is stored in first frame memory 101. First frame memory 101 variously outputs pixel values from the stored image data to transformer 102 according to an encoding mode determined by block mode deciding unit 110. That is, pixel values for a current data block are received by transformer 102 where an intra mode is determined, but only the differences between the pixel values of a current data block and pixel values of a previous data block are received by transformer 102 where an inter mode is determined.

Transformer 102 performs a discrete cosine transform (DCT) on the pixel values received by transformer 102. The DCT is an algorithm transforming the frame data for the input image from a space domain into a frequency domain. The DCT thereby eliminates spatial redundancy in the image data by dumping a high frequency portion of the image data and concentrating the information content of the image data into a low frequency portion. The high frequency portion of the image data includes many pixels having a large difference value from a neighboring pixel. For example, the high frequency portion of the input image data includes portions of the image expressing fluctuating edges, such as the outline of a face or hairs streaming in the wind. The DCT eliminates the high frequency portions of the input image data in order to increase the compression rate for the data.

Quantization unit 103 quantizes the discrete-cosine transformed image data received from transformer 102. That is, quantization unit 103 divides coefficient values associated with the image data using a quantizer value in order to express the image data with more "0" values.

Encoding unit 104 compresses and encodes quantized image data with a motion vector based on a variable length coding (VLC) in order to generate an output stream. The VLC is a conventionally understood encoding scheme adapted to encode data by assigning a shorter code to data having a relatively high occurrence rate and assigning a longer code to data having a relatively low occurrence rate.

Motion estimator 108 calculates a motion vector. That is, motion estimator 108 derives a motion vector defined by the relationship between the current data block stored in first frame memory 101 and image data block most similar to the current data block contained within a search area of image data stored in second frame memory 107 and related to a previous image frame.

The quantized image data may be restored to its original image data form (i.e., "recovered") by passing it through inverse-quantization unit 105 and inverse-transforming unit 106. The recovered image data is stored in second frame memory 107 with data outputted from motion estimator 108 and motion compensator 109. Motion estimator 108 and motion compensator 109 obtain the motion vector, and compensate the restored image data by comparing the image data of the input image with the restored image data stored in second frame memory 107.

FIG. 2 is a block diagram showing a block mode deciding unit according to a prior art. With reference to FIG. 2, how the block mode deciding unit decides an intra mode or an inter mode will be explained hereinafter.

As shown in FIG. 2, the block mode deciding unit 110 comprises a first accumulator 201, a second accumulator 202 and a first comparator 203.

When pixel data from a current frame is received by block mode deciding unit 110, first accumulator 201 calculates a variation (VAR) value related to the current data block. The VAR of the current data block is calculated by obtaining differences between each pixel value in the current frame and an average pixel value for the data block, and thereafter summing the differences. The average pixel value for a data block may be calculated by adding all of the pixel values in the data block and dividing the result by the number of pixels in the data block.

Second accumulator 202 calculates an optimized sum of absolute differences (SAD) using a motion vector defined by the relationship between current frame pixel data and previous frame pixel data. A SAD value is defined by an accumulation of absolute values related to differences between the current frame pixel data and previous frame pixel data. An optimized SAD value (Min SAD) is defined as a minimum SAD value within a plurality of SAD values obtained from the current motion estimator.

First comparator 203 compares the VAR obtained by first accumulator 201 and the Min SAD obtained by second accumulator 202 to define a first threshold value (TH1) as an output. This comparison of the VAR and Min SAD is used by the block mode deciding unit to determine block mode. For example, if the difference between the VAR and Min SAD is larger than a defined threshold value for the first threshold value (TH1), the intra mode is determined, or if the difference between the VAR and the optimized SAD is smaller than the defined threshold value for the first threshold value (TH1), the inter mode is determined.

When the image encoder compresses image data using the intra mode, all of the pixel values for the current data block are compressed. However, only the differences between the current data block and the previous data block are compressed when the image encoder compresses image data using the inter mode. Therefore, the inter mode provides a higher compression rate than the intra mode.

Generally, an imaging system having (or adapted from use with) a camera module includes an auto exposure controller adapted to control the amount of light entering the camera.

The auto exposure controller shortens the exposure time for an image having a relatively large amount of the light, or lengthens the exposure time for an image having a lesser amount of the light. An image generated under auto exposure control includes all of the pixels in a current frame block having a constant offset value for an associated brightness (luminescence) element as compared with pixels in the previous frame block. The offset value generates a brightness difference between the current frame block and the previous frame block. Therefore, when the image encoder compresses an auto-exposure controlled image, an image having less movement may result in an intra mode being determined for the image as a result of the presence of the offset value. Therefore, compressed bit stream is increased, and the compression rate is generally degraded when an image subjected to auto-exposure control is compressed.

SUMMARY OF THE INVENTION

Accordingly, embodiments of the invention are variously directed to a method and a related circuit determining a block mode for auto-exposure controlled image data that does not result in a degraded compression rate. Rather, embodiments of the invention provide a method of effectively determining a block mode for auto-exposure controlled image data having an improved image compression rate over conventional methods and a related circuit.

Thus, in one embodiment, an image compression method adapted to determining a block mode for an input image, comprising; (a) determining an intra mode or an inter mode by, obtaining a motion vector of a current image frame's pixel data and a previous image frame's pixel data, in relation to the motion vector, calculating a first sum by adding differences between the current image frame's block pixel data and the previous image frame's block pixel data, calculating a first variation for a current block, and comparing a difference between the first sum and the first variation with a first threshold value, and (b) upon determining an intra mode in (a), determining whether or not the input image is an auto-exposure controlled image, calculating a second sum by adding differences between the previous image frame's block pixel data and the current image frame's block pixel data, calculating a second variation for a current block by eliminating an offset value generated by an auto exposure control from the current image frame's pixel data, and comparing a difference between the second sum and the second variation with a second threshold value.

In another embodiment, the invention provides an image compression method adapted to determine a block mode for an input image, comprising; (a) obtaining an optimized sum of absolute difference (SAD) from a motion vector defined in relation to a current frame's pixel data and a previous frame's pixel data, (b) calculating a first variation by summing differences between each of pixel data in the current frame and an average value for the pixel data in a block, (c) determining an inter mode or an intra mode from a comparison of the optimized SAD and the first variation, (d) if an intra mode is determined, then determining whether or not the input image is an auto exposure controlled image, (e) calculating a second variation by; (i) obtaining first differences between each of pixel data in the current frame and the average value of pixel data in the block, (ii) obtaining a second difference between the first differences and an offset value generated by an auto exposure control, and (iii) adding the first differences and the second differences, and (f) determining an inter mode or an intra mode by comparing the optimized SAD and the second variation.

In yet another embodiment, the invention provides a block mode deciding device, comprising; a first block mode deciding unit adapted to determine an intra mode or an inter mode for an input image by obtaining a motion vector derived from a current image frame's pixel data and a previous image frame's pixel data and comparing the motion vector to a first threshold value, an auto exposure determining unit adapted to determine whether or not an input image is an auto-exposure controlled image, and a second block mode deciding unit adapted to determine an inter mode or an intra mode for the input image, responsive to an intra mode determination by the first block mode deciding unit and a determination by the auto exposure determining unit that the input image is an auto-exposure controlled image, by obtaining a motion vector after eliminating an offset value generated by an auto-exposure control from the current frame's pixel data and comparing the offset-eliminated motion vector to a second threshold value.

In still another embodiment, the invention provides a block mode deciding unit, comprising; a first accumulator adapted to calculate a first variation by summing differences between pixel data in a current frame of an input image and an average value of pixel data in a block, a second accumulator adapted to calculate an optimized sum of absolute difference (SAD) using a motion vector derived in relation to the current frame's pixel data and a previous frame's pixel data, a first comparator adapted to determine an inter mode or an intra mode for the input image in relation to the first variation and the SAD, a third accumulator adapted to calculate a second variation by obtaining first differences between the pixel data in the current frame and the average value of pixel data in the block, obtaining second differences between the first differences and an offset value generated by an auto exposure control, and adding the first and second differences when the input image is an auto-exposure controlled image, a mode recognizer adapted to recognize a determination by the first comparator of an intra mode or an inter mode, an auto exposure determining unit adapted to determine whether or not the input image is an auto-exposure controlled image upon a recognition by the mode recognizer of an intra mode, a second comparator adapted to determine an inter mode or an intra mode in relation to an optimized SAD to the second variation upon a determination of the auto exposure determining unit that the input image is an auto-exposure controlled image, and a mode output unit providing an output signal indicating an inter mode or an intra mode.

BRIEF DESCRIPTION OF THE DRAWINGS

Several embodiments of the invention are described hereafter with reference to the accompanying drawings in which:

FIG. 5 is a flowchart illustrating an exemplary method of deciding a block mode of an auto-exposure controlled image according to one embodiment of the invention.

DESCRIPTION OF EXEMPLARY EMBODIMENTS

Reference will now be made in some additional detail to embodiments of the invention, examples of which are illustrated in the accompanying drawings. However, the present invention is not limited to the illustrated embodiments.

Figure 1:
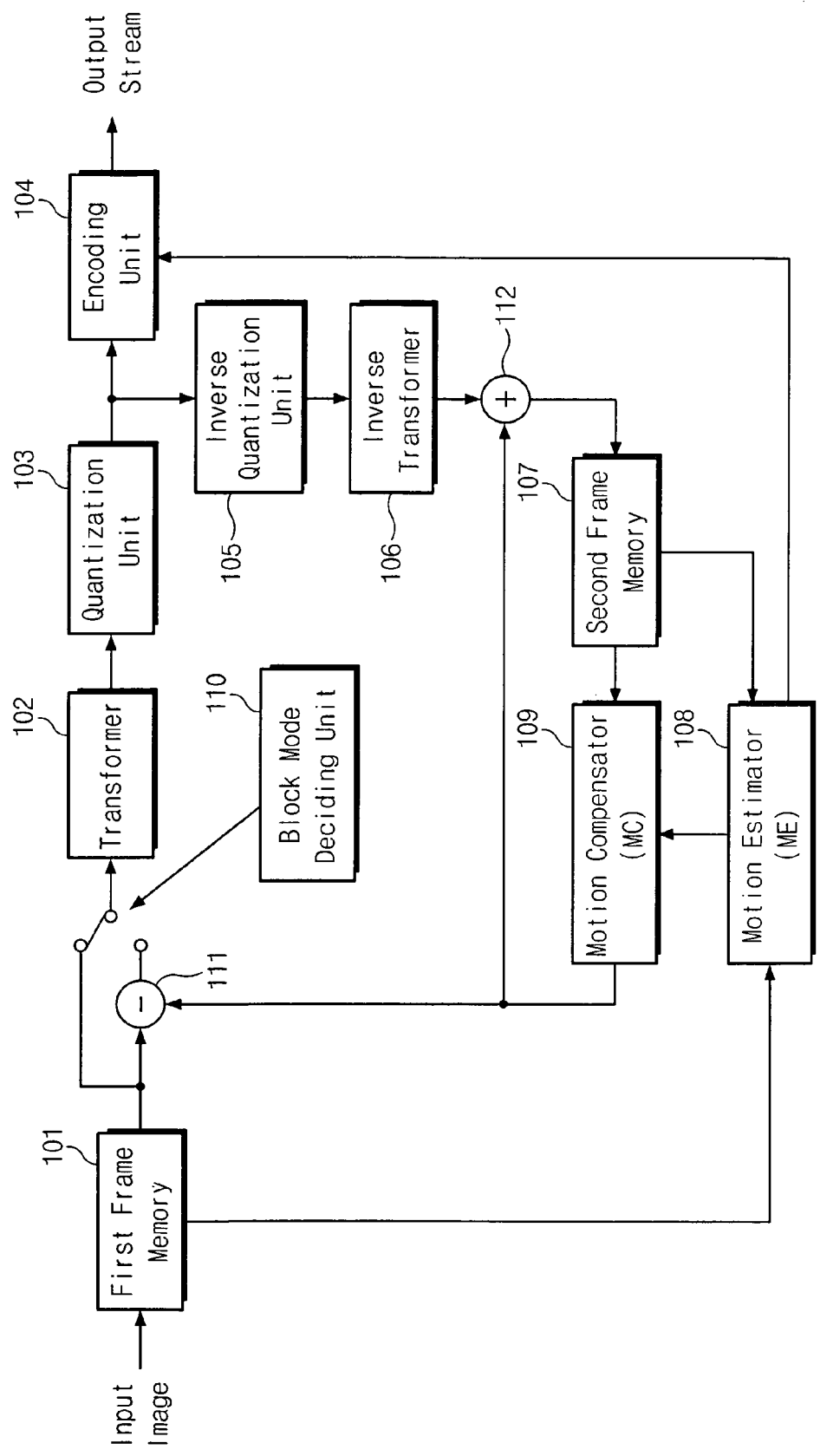
FIG. 1 is a block diagram illustrating a conventional image encoder.
Figure 2:
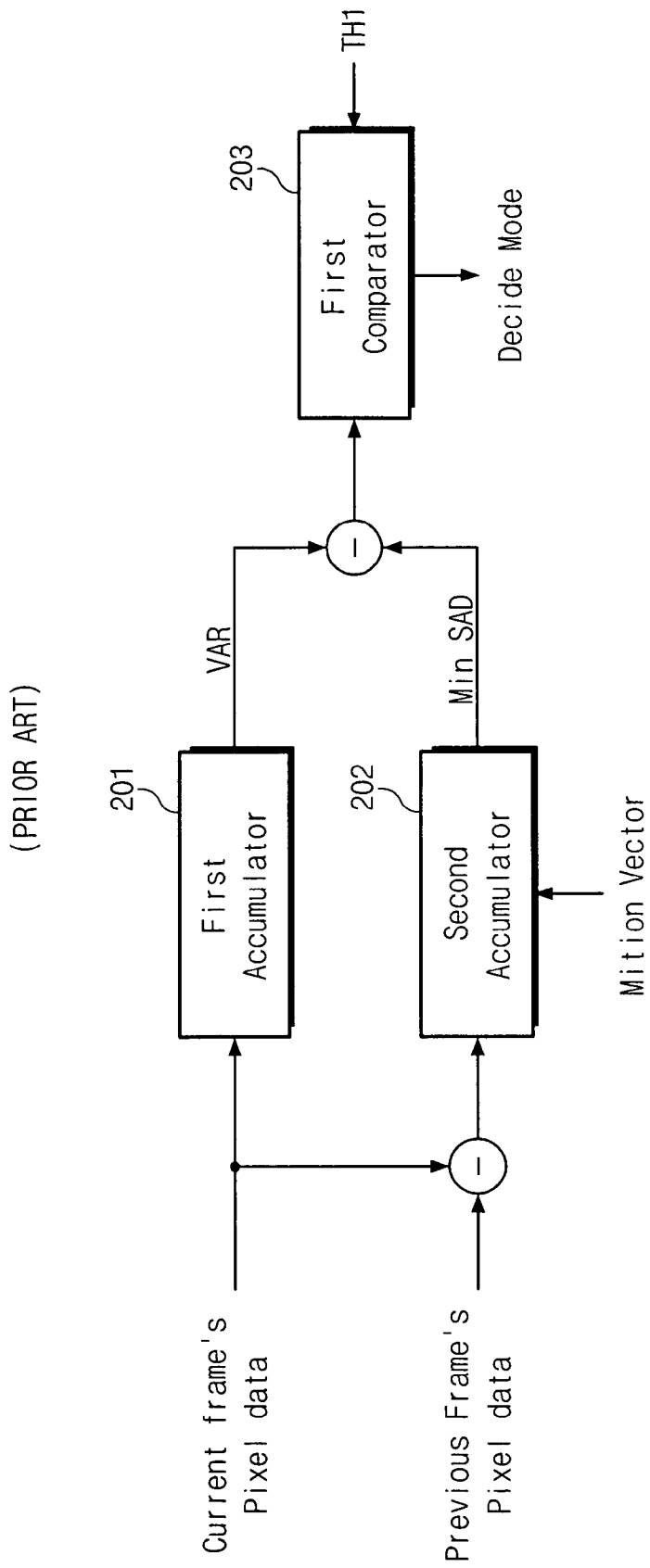
FIG. 2 is a block diagram showing a conventional block mode deciding unit adapted for use within the conventional image encoder of FIG. 1.
Figure 3:
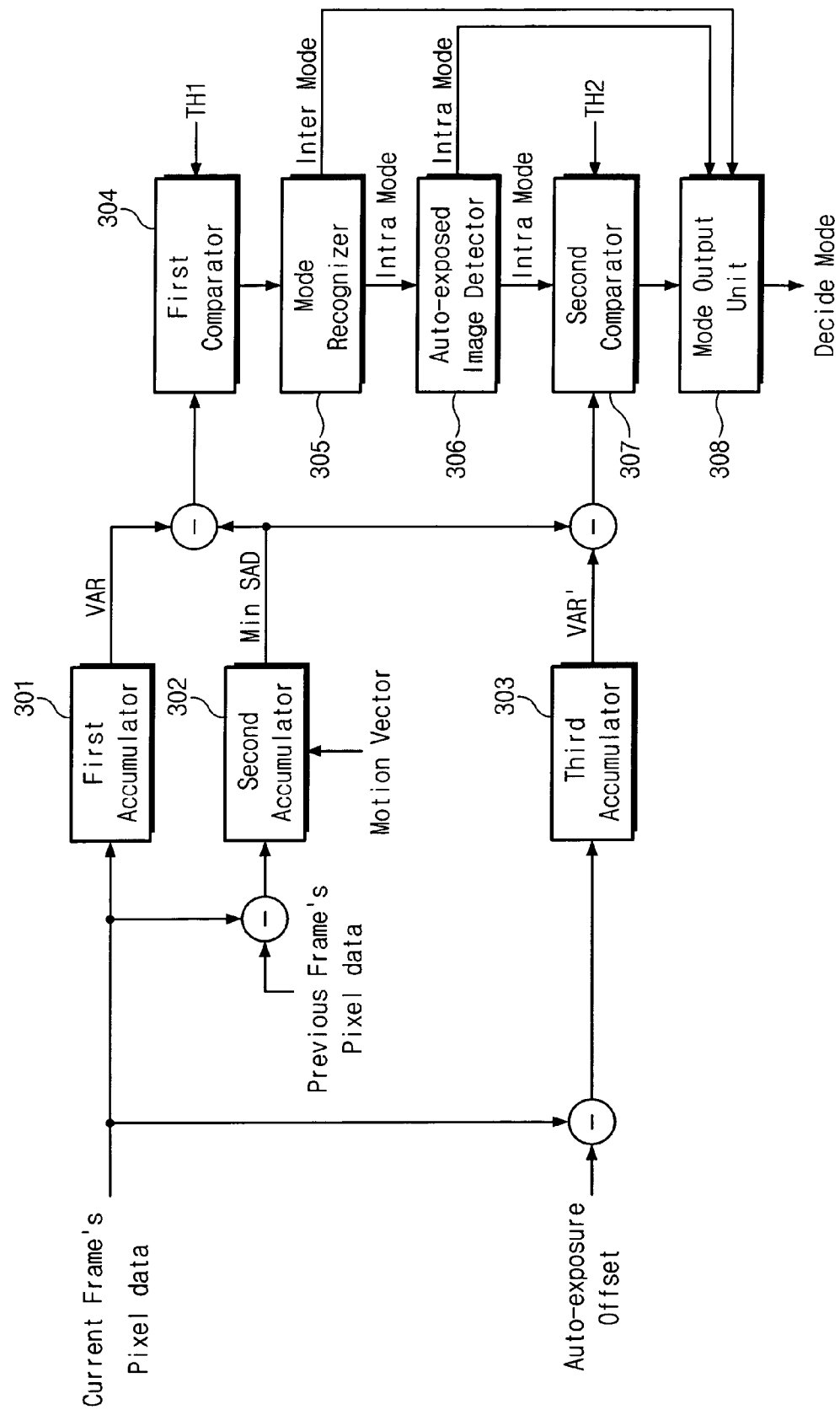
FIG. 3 is a block diagram illustrating a block mode deciding unit according to one embodiment of the invention.

FIG. 3 is a block diagram illustrating a block mode deciding unit according to one embodiment of the invention. An exemplary method of determining a block mode in relation to image data subjected to auto-exposure control will be described in relation to the illustrated block mode deciding unit. The exemplary block mode deciding unit comprises functional blocks adapted to eliminate the offset value generated by an auto exposure control process. The exemplary block mode deciding unit shown in FIG. 3 may be instructively compared to the conventional block mode deciding unit shown in FIG. 2.

As shown in FIG. 3, the block mode deciding unit according to one embodiment of the invention comprises a first accumulator 301, a second accumulator 302, a third accumulator 303, a first comparator 304, a mode recognizer 305, an auto-exposure controlled image detector 305, a second comparator 307, and a mode outputting unit 308.

First comparator 304 performs essentially the same operations as first comparator 203 described in relation to the conventional block mode deciding unit of FIG. 2.

However, third accumulator 303 eliminates the offset value included in a pixel data value of a current frame, and obtains a second variation (VAR') of a block by summing differences between each pixel data value in the block and an average pixel data value of the block.

After first comparator 304 decides a block mode, mode recognizer 305 determines whether the block mode of the current block is an intra mode or an inter mode. For example, if mode recognizer 305 determines that the current block is the intra mode, a mode value for the current block is provided by mode output unit 308. In contrast, if mode recognizer 305 determines that the current block is the inter mode, auto-exposed image detector 306 determines whether the input image is an auto-exposure controlled image by referring to an auto-exposure setting value in each image. If the input image is not the auto-exposure controlled image, the block mode decided by first comparator 304 becomes a final mode value because the input image does not include an offset value. The final mode value is provided through mode output unit 308. On contrary, if the input image is an auto-exposure controlled image, second comparator 307 decides a block mode for the current block by comparing a computation result value obtained by eliminating the offset value generated by the auto exposure control and a second threshold value (TH2).

That is, second comparator 307 obtains a difference value between the second variation (VAR') obtained from third accumulator 303 and the Min SAD value obtained by second accumulator 302, and decides a block mode for the current image block by comparing the obtained difference value to the second threshold value (TH2). For example, if the difference value is larger than a predetermined second threshold value (TH2), second comparator 307 decides the block mode of the current block as an intra mode. On contrary, if the difference value is smaller than the second threshold value (TH2), second comparator 307 decides the block mode of the current block as an inter mode. The decided mode value at second comparator 307 is provided through mode output unit 308.

Since second comparator 307 decides a block mode using the second variant (VAR') which is an offset-eliminated variant of the received image data, a block mode of an image block having small movements is not determined as an intra mode in the exemplary embodiment. Therefore, the conventional problem of an increased compressed bit stream is eliminated in the exemplary embodiment.

Figure 4:
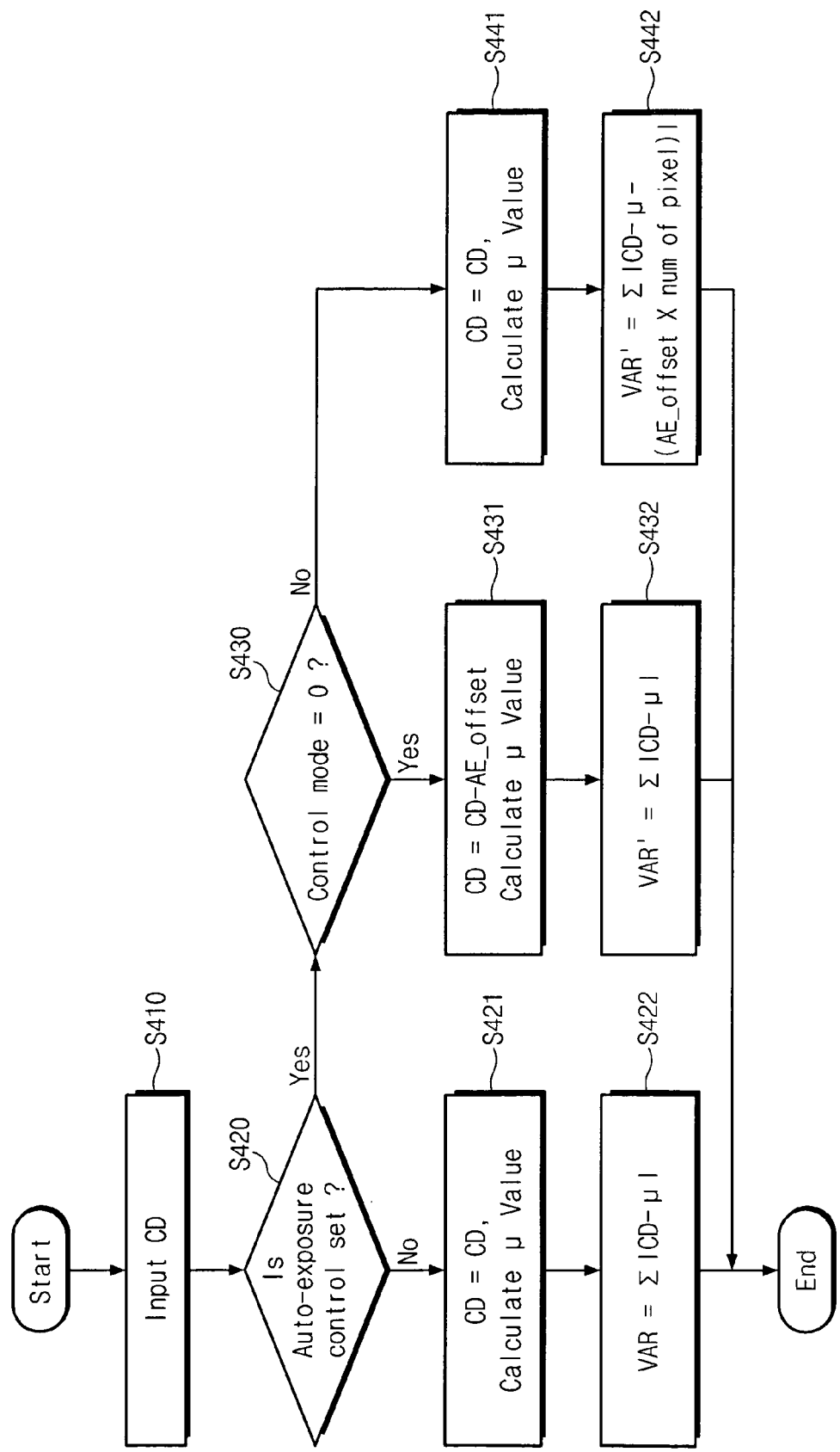
FIG. 4 is a flowchart illustrating an exemplary method of obtaining a variation in a block mode deciding unit according to one embodiment of the invention.

FIG. 4 is a flowchart illustrating an exemplary method of obtaining a variant (VAR) for block mode deciding unit according to one embodiment of the invention. Exemplary method steps will be indicated in the following description with parentheses (SXXX) to be clearly distinct form circuit elements.

Referring collectively to FIGS. 3 and 4, when a current frame pixel data (CD) is received by block mode deciding unit (S410), it determines whether an auto exposure control is set or not (S420). According to the result of this determination, an offset value generated by the auto exposure control may or may not be eliminated from the current frame's pixel data when the variant (VAR) is calculated. For example, if the auto exposure control is not set, the variant (VAR) is calculated without eliminating the offset value. That is, an average value (μ) of a current block is obtained by using the current frame's pixel data value without eliminating the offset value (S421). The average value (μ) of a current block is calculated by adding all pixel values in a block and dividing the adding result by the number of pixels in the block. After obtaining the average value (μ), the first variant (VAR) of the current block is calculated by summing differences between each of pixel values in the current block and the average value (μ) of the current block (S422).

However, if the auto exposure control is set, the variant is calculated by eliminating the offset value (AE_offset) from the current image frame's pixel data values. If the auto exposure control is set, it determines whether a value of a control mode is '0' (S430). The value of the control mode is used to determine when the offset value (AE_offset) is eliminated. For example, if the value of the control mode is '0', the second variant (VAR') is calculated after eliminating the offset value (AE_offset) from the current frame's pixel data value (CD). That is, a current frame's pixel data values are obtained by subtracting the offset value (AE_offset) from the current frame's pixel data values, and the average value (μ) of the current block is calculated by adding all pixel values in the block and dividing the adding result by the number of the pixels in the block (S431). And, the second variant (VAR') is calculated by summing difference values between each pixel value of the offset value eliminated current frame's pixel data and the average value (μ) of the current image block (S432).

In contrast, if the control mode value is not '0', the offset value is eliminated after the second variant (VAR') is obtained. That is, a current frame's pixel data (CD) values are obtained without eliminating the offset value (AE_offset), an average value (μ) of the current block is calculated by adding all pixel value in the block and dividing the adding result by the number of the pixels in the block (S441). And, the second variant (VAR') of the current block is obtained by obtaining a plurality of first differences between pixels of the current block and the average value (μ) of the current block, obtaining a plurality of second differences between the first differences and the offset value (AE_offset), and summing the second differences (S442).

The variant obtained by the exemplary method illustrated in the flowchart of FIG. 4 may be used to decide a block mode for the current block by the block mode deciding unit.

FIG. 5 is a flowchart illustrating a method of determining a block mode of an auto exposure controlled image according to one embodiment of the invention.

When a previous frame's pixel data (PD) and a current frame's pixel data (CD) are received in the block mode deciding unit (S510), motion vectors for the input images are estimated (S520). By using the motion vectors obtained from the current frame's pixel data (CD) and the previous frame's pixel data (PD), an optimized SAD (Min SAD) value is calculated (S530). A difference value between the first variant (VAR) and the optimized SAD (Min SAD) value is compared to the first threshold value (TH1) (S540). If the difference value between the first variant (VAR) and the optimized SAD (Min SAD) is smaller than the first threshold value (TH1), an inter mode is determined for the current block (S570).

However, if the difference value between the first variant (VAR) and the optimized SAD (Min SAD) is larger than the first threshold value (TH1), it determines whether or not the input image is an auto-exposure controlled image (S550). If the input image is not an auto-exposure controlled image, an intra mode is decided for the current block (S580). Otherwise, if the input image is an auto-exposure controlled image, a difference value between the second variant (VAR') and the optimized SAD (Min SAD) value is compared to a second threshold value (TH2) (S560). If the difference value is smaller than the second threshold value (TH2), an inter mode is determined for the current block (S570). On the contrary, if the difference value between the second variant (VAR) and the optimized SAD (Min SAD) value is larger than the second threshold value (TH2), an intra mode is determined for the current block (S580).

As described above, a block mode of the current image block is not determined as an intra mode when the difference value between the first variant (VAR) and the optimized SAD (Min SAD) value is larger than the first threshold value (TH1) in the exemplary embodiment. Before deciding the intra mode when the difference value is larger than the first threshold value (TH1), the input image is analyzed in order to determine whether or not the input image is an auto exposure controlled image. If the input image is the auto exposure controlled image, the second variant (VAR') is calculated by eliminating the offset value (AE_offset) and the calculated second variant (VAR') is applied to determine the block mode of the current image block. Accordingly, a block mode of an image having less movement is not determined as the intra mode by the exemplary embodiment. Therefore, the amount of compressed bit stream is dramatically reduced by eliminating the offset value from the current frame's pixel data when a block mode of auto-exposure controlling image block is determined. Also, image compression efficiency is improved.

It will be apparent to those skilled in the art that various modifications and variations may be made to the foregoing embodiments. The scope of the invention as defined by the following claims is intended to cover all such modifications and variations and their equivalents.

What is claimed is:

1. An image compression method adapted to determining a block mode for an input image, comprising:
    (a) determining an intra mode or an inter mode by;
        obtaining a motion vector of a current image frame's pixel data and a previous image frame's pixel data, in relation to the motion vector, calculating a first sum by adding differences between the current image frame's block pixel data and the previous image frame's block pixel data,
        calculating a first variation for a current block, and
        comparing a difference between the first sum and the first variation with a first threshold value; and,
    b) upon determining an intra mode in (a),
        determining whether or not the input image is an auto-exposure controlled image;
        calculating a second sum by adding differences between the previous image frame's block pixel data and the current image frame's block pixel data,
        calculating a second variation for a current block by eliminating an offset value generated by an auto exposure control from the current image frame's pixel data, and
        comparing a difference between the second sum and the second variation with a second threshold value.

2. The method of claim 1, wherein the motion vector is a difference between the current image frame's pixel data and the previous image frame's pixel data and represents whether motion variation in the input image is larger than a previous input image.

3. The method of claim 2, wherein (a) further comprises:
    determining an inter mode if the difference between the first sum and the first variation is smaller than the first threshold value; and,
    determining an intra mode if the difference between the first sum and the first variation is larger than the first threshold value.

4. The method of claim 3, wherein (b) further comprises:
    determining an intra mode when the input image is not an auto exposure controlled image.

5. The method of claim 1, wherein (b) further comprises:
    determining an inter mode if the difference between the second sum and the second variation is smaller than the second threshold value; and,
    determining an intra mode if the difference between the second sum and the second variation is larger than the second threshold value.

6. An image compression method adapted to determine a block mode for an input image, comprising:
    (a) obtaining an optimized sum of absolute difference (SAD) from a motion vector defined in relation to a current frame's pixel data and a previous frame's pixel data;
    (b) calculating a first variation by summing differences between each of pixel data in the current frame and an average value for the pixel data in a block;
    (c) determining an inter mode or an intra mode from a comparison of the optimized SAD and the first variation;
    (d) if an intra mode is determined, then determining whether or not the input image is an auto exposure controlled image;
    (e) calculating a second variation by:
        (i) obtaining first differences between each of pixel data in the current frame and the average value of pixel data in the block,
        (ii) obtaining a second difference between the first differences and an offset value generated by an auto exposure control, and
        (iii) adding the first differences and the second differences; and
    (f) determining an inter mode or an intra mode by comparing the optimized SAD and the second variation.

7. The method of claim 6, wherein the optimized SAD is a minimum SAD within a plurality of SADs determined by a current motion estimation block.

8. The method of claim 6, wherein the average value of pixel data in the block is calculated by adding all pixels in the block and dividing the result by the number pixels in the block.

9. The method of claim 6, wherein (c) further comprises:
determining a difference between the optimized SAD and the first variation and comparing the difference to a first threshold value.

10. The method of claim 9, wherein (c) further comprises:
determining an inter mode if the difference between the optimized SAD and the first variation is smaller than the first threshold value; or,
determining an intra mode if the difference between the optimized SAD and the first variation is larger than the first threshold value and the input image is not an auto exposure controlled image.

11. The method of claim 10, wherein (f) further comprises:
determining an intra mode if a difference between the optimized SAD and the second variation is larger than the second threshold value; or,
determining an inter mode if the difference between the optimized SAD and the second variation is smaller than the second threshold value.

12. A block mode deciding device, comprising:
a first block mode deciding unit adapted to determine an intra mode or an inter mode for an input image by obtaining a motion vector derived from a current image frame's pixel data and a previous image frame's pixel data and comparing the motion vector to a first threshold value;
an auto exposure determining unit adapted to determine whether or not an input image is an auto-exposure controlled image; and
a second block mode deciding unit adapted to determine an inter mode or an intra mode for the input image, responsive to an intra mode determination by the first block mode deciding unit and a determination by the auto exposure determining unit that the input image is an auto-exposure controlled image, by obtaining a motion vector after eliminating an offset value generated by an auto-exposure control from the current frame's pixel data and comparing the offset-eliminated motion vector to a second threshold value.

13. The block mode deciding device of claim 12, wherein the motion vector is a difference between the current image frame's pixel data and the previous image frame's pixel data and represents whether motion variation in the input image is larger than a previous input image.

14. The block mode deciding device of claim 13, wherein the first block mode determines an inter mode if the motion vector is smaller than the first threshold value, or an intra mode if the motion vector is larger than the first threshold value.

15. The block mode deciding device of claim 14, wherein the first block mode deciding unit determines an intra mode for the input image if the auto exposure determining unit determines that the input image is not an auto exposure controlled image.

16. The block mode deciding device of claim 12, wherein the second block mode determining determines an inter mode for the input image if the offset-eliminated motion vector is smaller than the second threshold value, or an intra mode for the input image if the offset-eliminated motion vector is larger than the second threshold value.

17. A block mode deciding unit, comprising:
a first accumulator adapted to calculate a first variation by summing differences between pixel data in a current frame of an input image and an average value of pixel data in a block;
a second accumulator adapted to calculate an optimized sum of absolute difference (SAD) using a motion vector derived in relation to the current frame's pixel data and a previous frame's pixel data;
a first comparator adapted to determine an inter mode or an intra mode for the input image in relation to the first variation and the SAD;
a third accumulator adapted to calculate a second variation by obtaining first differences between the pixel data in the current frame and the average value of pixel data in the block, obtaining second differences between the first differences and an offset value generated by an auto exposure control, and adding the first and second differences when the input image is an auto-exposure controlled image;
a mode recognizer adapted to recognize a determination by the first comparator of an intra mode or an inter mode;
an auto exposure determining unit adapted to determine whether or not the input image is an auto-exposure controlled image upon a recognition by the mode recognizer of an intra mode;
a second comparator adapted to determine an inter mode or an intra mode in relation to an optimized SAD to the second variation upon a determination of the auto exposure determining unit that the input image is an auto-exposure controlled image; and
a mode output unit providing an output signal indicating an inter mode or an intra mode.

18. The block mode deciding unit of claim 17, further comprising a current motion estimation block adapted to determine a plurality of SADs containing the optimized SAD.

19. The block mode deciding unit of claim 17, wherein the average value of pixel data in the block is calculated by adding all pixels in the block and dividing the result by the number pixels in the block.

20. The block mode deciding unit of claim 19, wherein the input image is applied to the auto exposure determining unit only if an intra mode is recognized by the mode recognizer.

21. The block mode deciding unit of claim 20, wherein the auto exposure determining unit determines whether or not the input image is the auto-exposure controlled image by referring to an auto exposure control value set in the input image.

22. The block mode deciding unit of claim 21, wherein the mode output unit outputs an intra mode for the input image if the auto exposure determining unit determines that the input image is not an auto-exposure controlled image.

23. The block mode deciding unit of claim 21, wherein the second comparator determines an inter mode if the auto exposure determining unit determines that the input image is an auto-exposure controlled image.

24. The block mode deciding unit of claim 23, wherein the second comparator compares a difference between the second variation and the optimized SAD with the second threshold value.

25. The block mode deciding unit of claim 24, wherein the second comparator determines an inter mode if the difference between the second variation and the optimized SAD is smaller than the second threshold value; or,
wherein the second comparator determines an intra mode if the difference between the second variation and the optimized SAD is larger than the second threshold value.

26. The block mode deciding unit of claim 25, wherein the determination by the second comparator is output through the mode output unit.

27. The block mode deciding unit of claim 17, wherein the first comparator compares a difference between the optimized SAD and the first variation with a first threshold value.

28. The block mode deciding unit of claim 27, wherein the first comparator determines an inter mode if the difference between the optimized SAD and the first variation is smaller than the first threshold value; or, wherein the first comparator determines an intra mode when the difference between the optimized SAD and the first variation is larger than the first threshold value and the input image is not an auto exposure controlled image.

29. The block mode deciding unit of claim 28, wherein the mode recognizer outputs the block mode decided in the first comparator through the mode output unit when the decided block mode value is an inter mode.

* * * * *